Aug. 3, 1954

J. F. BRUNDAGE 2,685,159

OFFSET DISK HARROW

Filed Oct. 27, 1947

Inventor
John F. Brundage
by Kimball & Wyman
Attorney

Aug. 3, 1954
J. F. BRUNDAGE
2,685,159
OFFSET DISK HARROW
Filed Oct. 27, 1947
3 Sheets-Sheet 2
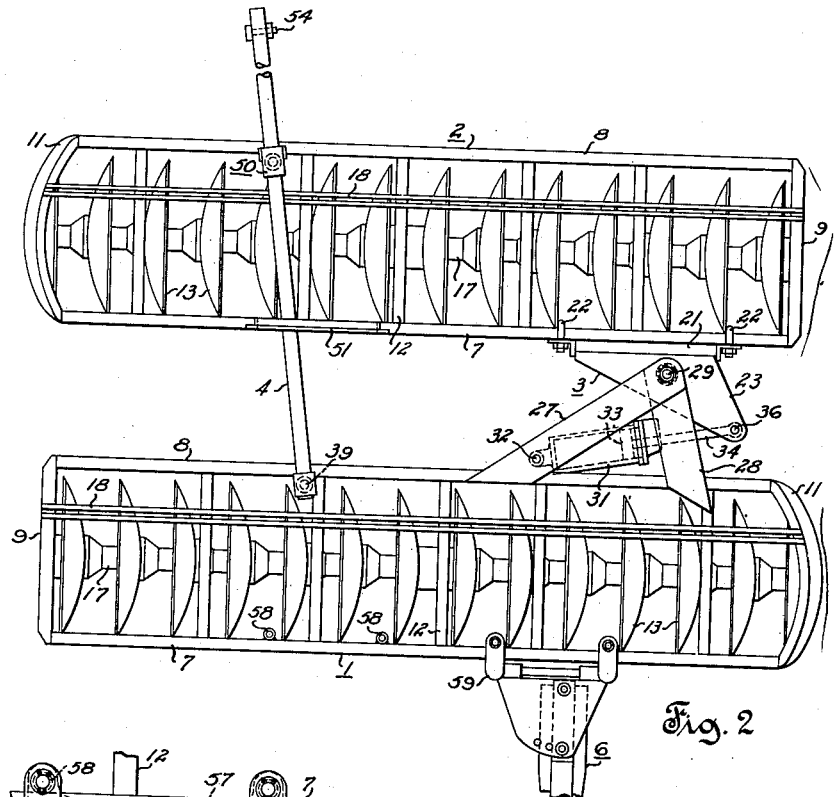
Fig. 2
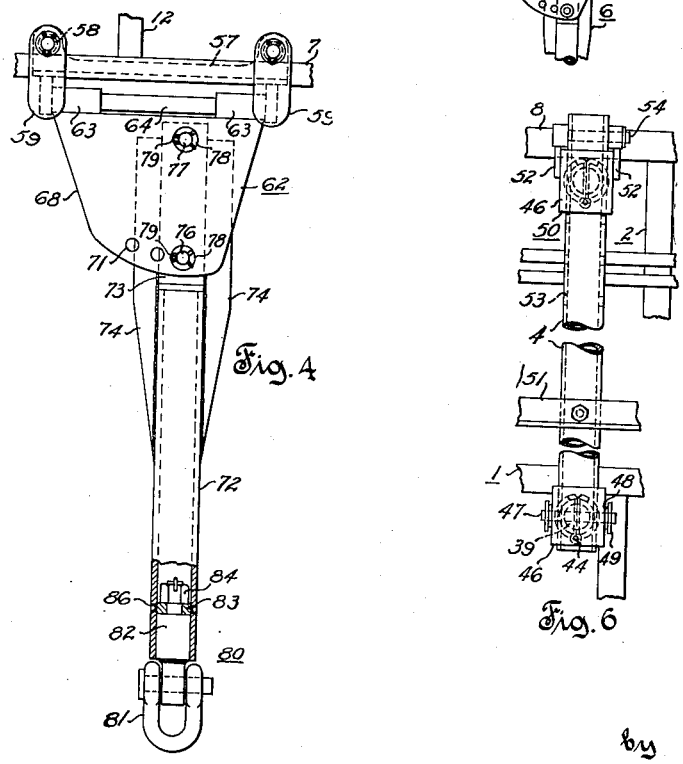
Fig. 4
Fig. 6
Inventor
John F. Brundage
by Kimball S. Wyman
Attorney Aug. 3, 1954

J. F. BRUNDAGE 2,685,159

OFFSET DISK HARROW

Filed Oct. 27, 1947

Inventor
John F. Brundage
by Kimball S. Wyman
Attorney

Patented Aug. 3, 1954

2,685,159

UNITED STATES PATENT OFFICE 2,685,159

OFFSET DISK HARROW

John F. Brundage, Oxnard, Calif., assignor to Allis-Chalmers Manufacturing Company, Milwaukee, Wis., a corporation of Delaware Application October 27, 1947, Serial No. 782,402

15 Claims. (Cl. 55—81.7)

This invention relates to tandem disc harrows of the type comprising front and rear gangs operatively coupled together and connectable with a suitable propelling vehicle for controlling relative movement into and out of a gang-angled working position. And the general object of the present invention is to provide an improved harrow construction characterized by a reduction in the number of parts and simplification as to the construction and coaction thereof, all to the end: that the cost of producing, assembling and replacing same is materially reduced; that various parts and more particularly the draft structure and the hinge connection between front and rear gangs are combined to form compact rugged assemblies; that relative movements of the front and rear gangs can be readily effected by means of a power device or by propelling the harrow forward or rearward; and that rear gang lateral adjustment may be readily accomplished through a suitable application of draft force.

More particularly, a further object of this invention is concerned with certain of the above mentioned features and is directed toward and contemplates the provision of an improved draft means for harrows affording numerous additional advantages including: a more equal division of the working angle between the front and rear gangs irrespective of variations in the total working angle; a wide range of offsetting positions; a close coupled hitch point to the tractor drawbar; vertical adjustment of the connection between the rear end of the draft structure and the front gang frame for controlling front gang disc penetration through vertical component of drawbar pull; and complete flexibility between the forward end of the draft structure and the tractor drawbar.

Another object of the present invention also involves some of the above mentioned features and is concerned with and contemplates the provision of an improved connection between front and rear gangs affording further advantages including: rear gang lateral adjustment in any increment desired by first loosening one element of the hinge connection and then applying force longitudinally of the draft structure; use of a hydraulic device comprising a cylinder and piston unit for forcing the front and rear gangs into a straightened transport position or into a gang-angled working position; and ready substitution of a simple bar and latch mechanism for the hydraulic unit whereby the gangs may be straightened or angled by appropriately moving the harrow forward or rearward.

Still another object of the present invention is concerned with a harrow of the type hereinabove mentioned having a hydraulic device for forcibly angling the gangs into a working position and is directed toward and contemplates the provision of a chatter bar by operatively connected with frame portions of the front and rear gangs remote from the hinge connection therebetween so as to function as a stop means for limiting maximum angling of the gangs when effected by operation of a power angling device.

The manner in which one or more of the above mentioned advantages are attained through a reduction in the number of parts and simplification as to the construction, and coaction thereof will become readily apparent as the disclosure progresses and particularly points out additional features and advantages considered of special importance. And accordingly the present invention may be considered as comprising the various features of construction, combinations and subcombinations of elements and parts as is hereinafter more fully set forth in the detailed description and appended claims, reference being had to the accompanying drawings illustrating but one embodiment of the invention, and in which:

Fig. 2 is a plan view of the structure shown in Fig. 1, the flexible conduits omitted, with the gangs disposed in straightened or transport position, and with the draft head block on the front gang adjusted to the right as viewed in the drawings;

Fig. 4 is an enlarged top plan view of the draft structure;

Fig. 6 is an enlarged top plan view of the chatter bar construction and mounting;

Figures 1, 9, 10:
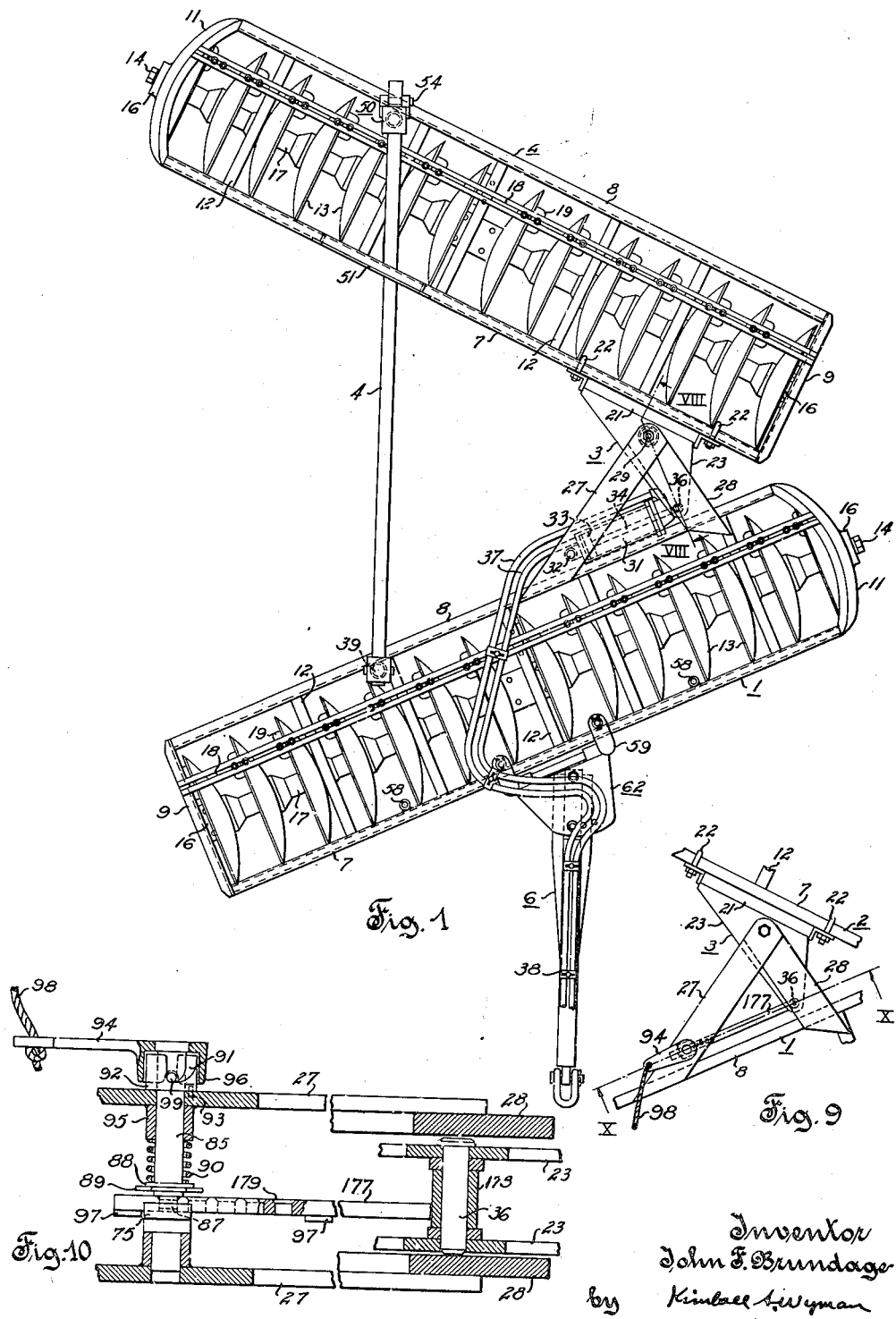
Fig. 1 is a plan view of a harrow constructed in accordance with the present invention and shown in gang-angled or working position.
Fig. 9 is a partial top plan view of the structure shown in Fig. 1 and illustrates a modified construction in that a simplified bar and latch mechanism is substituted for the hydraulic unit; and, Fig. 10 is an enlarged view taken on line X—X of Fig. 9.

As shown in Fig. 1 the harrow comprises front and rear gangs 1 and 2, respectively, a center hinge structure 3 operatively connecting the front and rear gangs for relative swinging movement about a vertical pivot axis, a chatter bar 4 operatively connecting similarly located points on the front and rear gang frames remote from the hinge connection therebetween, and a draft structure 6. The front and rear gangs are generally similar and each includes a rigid frame structure comprising generally parallel front and rear side members 7 and 8, respectively, interconnected by a straight end member 9, by a curved end member 11, and by a plurality of intermediate bracing members 12. Each frame rotatably mounts similar disc gangs 13 through a conventional mounting structure including a shaft 14, bearings 16, and disc spacing elements 17. A more detailed description of this portion of the construction is deemed unnecessary for a complete understanding of the present invention. Each frame also includes a disc scraper supporting bar structure 18 having scraper elements 19 adjustably mounted thereon for coaction with the concave side of the discs. In connections with the foregoing it should be noted that, while the front and rear gangs are similar in construction, the front gang is reversed relative to the rear gang; that is, the curved end of the front gang frame is at the right side of the harrow while the corresponding part of the rear gang frame is at the left side of the harrow, as viewed in Figs. 1 and 2.

Figure 3:
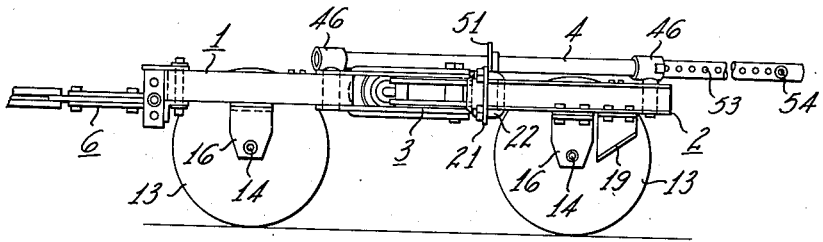
Fig. 3 is a side view of the structure shown in Fig. 2.
Figure 8:
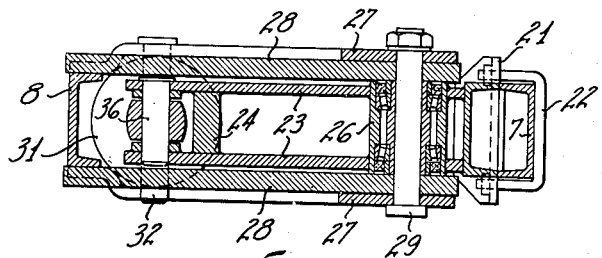
Fig. 8 is an enlarged view of the center hinge structure taken on line VIII—VIII of Fig. 1.

Referring also to Figs. 3 and 8, it will be noted that the center hinge structure 3 comprises a rigid bracket 21 adjustably secured to rear side frame member 7 of the rear gang by means of U bolts or clamps 22. This bracket presents a pair of rigid arms 23 projecting forwardly therefrom in vertically spaced, generally parallel relation with respect to each other and present free end portions remote from the bracket proper. The outer or free end portions of this pair of arms may be additionally braced by a rigid vertical strut 24. Intermediate portions of arms 23, that is portions intermediate the bracket proper and the above mentioned free end portions, are provided with vertically aligned openings in which is fixed a suitable pin receiving bearing structure 26. Rear side member 8 of the front frame is provided with a rigid rearwardly projecting bracket comprising a pair of rearwardly extending, vertically spaced and generally parallel arms 27 having forward end portions thereof fixedly secured to the front gang frame and a pair of vertically spaced, generally parallel brace members 28 having forward end portions similarly fixed to the front frame and having rear end portions welded or otherwise fixedly secured in parallel side abutting relation to the rear end portions of arms 27. The rear end portion of the bracket structure secured to the front gang frame, that is the united portions of arms 27 and brace members 28, have vertically aligned openings therethrough and are disposed on opposite sides of arms 23 with the vertical bearing therein aligned with the vertical openings in the front bracket structure to receive a detachable pin 29, thereby affording a vertical pivot axis about which the front and rear gangs may swing relative to each other. The frame end portions of arms 27 are provided with vertically aligned openings and one end of a hydraulic cylinder 31 is disposed between these arms and provided with a pivot pin receiving opening aligned with the holes in said arms. Pivot pin 32 is positioned through the vertically aligned openings in arms 27 and cylinder 31 thereby connecting one end of the cylinder to the adjacent end of the front gang frame for swinging movement relative thereto. A piston 33 is slidably movable within the cylinder and is provided with a rigid rod 34 projecting through the other or capped end of the cylinder. This exposed end of the rod is disposed between the free end portions of arms 23 and pivotally connected therewith by a suitable pin 36 extending through said arms and through an aligned opening or bearing portion in rod 34 (see Fig. 8). The opposite ends or heads of the cylinder are provided with suitable fluid passageways (not shown) to which are connected flexible fluid conductors 37 suitably supported on the front gang frame and draft structure by means of adjustable clamping devices 38. These conductors extend forward to the propelling vehicle and are operatively connected with a conventional hydraulic system for simultaneously supplying and withdrawing pressure fluid from opposite ends of the cylinder. In this connection, it should be noted that when the gangs are disposed in maximum angled working position, piston 33 is at the end of cylinder 31 and rod 34 attached thereto is disposed substantially wholly within the cylinder (see Fig. 1).

Figure 7:
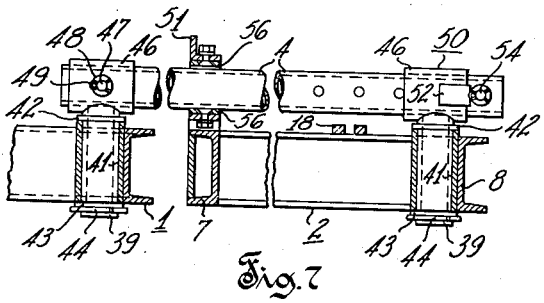
Fig. 7 is a side view of the structure shown in Fig. 6.

As best shown in Figs. 6 and 7, chatter bar 4 comprises a rigid, tubular member having its forward end pivotally secured to the rear side of the front gang frame at a point remote from the center hinge connection 3 by means of a pivot pin 39 mounted in a vertical sleeve or the like 41 fixedly secured to side member 8 at a point preferably adjacent its connection with the rear end of one of the brace elements 12. Pivot pin 39 is provided with a collar 42 engaging the top side of the sleeve 41 and its lower end projects therefrom and is held against vertical movement relative to the sleeve by means of a washer 43 and a cotter pin 44 holding the washer in place against the lower end of the sleeve. The upper end of pin 39 has fixed thereto a collar or sleeve 46 receiving the forward end of the chatter bar, the bar and sleeve having transverse, aligned openings therethrough for receiving a suitable securing pin 47 held in place by means of washers 48 and cotter pins 49 attached to the opposite projecting ends thereof. The chatter bar extends rearwardly from the front gang frame in overlying relation with respect to the rear gang frame and is mounted thereon for both sliding and pivotal movement relative thereto by means of a wear plate structure 51 carried by side member 7 and by means of a pivot connector 50 which is mounted on side member 8 of the rear frame. This pivot connector is similar in all material respects to that previously described for pivotally supporting the forward end of bar 4. However, the rear end of pivot connector 50 is provided with a pair of rearwardly extending stop projections 52 and the rear portion of bar 4 has a series of longitudinally spaced, transverse openings 53 therethrough adapted to receive a stop pin 54 provided with enlarged end portions adapted to engage stop projections 52 thereby limiting the maximum angle between the front and rear gang frames. The wear plate structure 51 comprises angle parts having opposite end portions secured to longitudinally spaced portions of rear frame side member 7 and presenting an intermediate portion disposed in vertically spaced, generally parallel relation with respect to the underlying portion of side member 7. The spaced opposed portions of this wear plate structure are provided with suitable wear plates 56 between which the chatter bar extends for free swinging movement laterally with respect to the rear gang.

Figure 5:
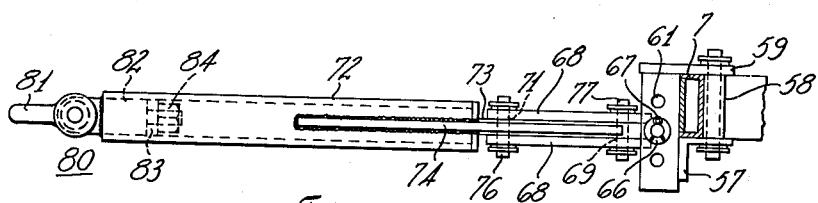
Fig. 5 is a side view of the structure shown in Fig. 4.

Referring more particularly to Figs. 4 and 5, it will be seen that the draft structure comprises a single head block 57 secured to side member 7 of front gang frame 1 for adjustment longitudinally therealong through means of longitudinally spaced pin receiving projections 58 on the rear side of this member. This head block is provided with longitudinally spaced, forwardly projecting, rigid, parallel portions 59 having pairs of vertically spaced aligned openings 61 therethrough generally parallel to side member 7. A tongue or pole supporting plate structure 62 is provided with laterally spaced aligned pin receiving projections 63 adapted to be received between and aligned with any selected pair of vertically spaced openings 61 in the head block in a manner affording an opening for pin 64 to extend therethrough to provide a horizontal pivot axis generally parallel to the axis of rotation of the front disc gang whereon the pole plate 62 can pivot relative to head block 57. Pin 64 is held in place by washers 66 and cotter pins 67 disposed on opposite ends thereof. Pole supporting structure 62 is formed of a pair of generally parallel, vertically spaced plate-like members 68 provided with a pair of vertically aligned holes 69 adjacent the rear portion thereof and with a series of pairs of vertically spaced holes 71 adjacent the forward end thereof, these holes at the forward end being disposed on an arc having as a center the vertically aligned holes 69 in the rear portion of this structure. A single, tubular draft pole 72 is provided with a flattened, plate-like, rearwardly extending portion which may be formed integrally with the pole or may be separately formed and attached to the rear end portion of the pole as by welding. In the shown construction, this flattened rear end comprises a central portion 73 having a thickness substantially equal to the spacing between the pole plate structure and marginally reinforcing side flanges 74 which extend alongside the pole proper in parallel edge-abutting relation thereto, these side flanges being formed either integral with or welded to the central thickened portion and the entire structure of plate 73 and flanges 74 being welded or otherwise suitably secured to the pole. In attaching the single draft pole 72 to the pole plate supporting structure 62, the rearwardly extending thickened portion 73 is disposed between plates 68 and is provided with a pair of longitudinally spaced apertures of which one aperture is arranged for alignment with the pair of vertically spaced holes 69 adjacent the rear of pole supporting structure 62 and of which the other aperture is arranged for alignment with one of the pairs of vertically spaced holes 71 at the front of the structure. Detachable pins 76 and 77 are then placed through the aligned series of holes in the front and rear portion, respectively, and are held in place by means of washers 78 and cotter pins 79 disposed on the opposite ends of the pins. The forward end of the pole is provided with a drawbar connector 80 comprising a clevis 81 fixed to a tubular bearing portion 82 rotatably disposed in the forward end of the pole and retained against longitudinal movement therein by means of an annular ring 83 surrounding a first reduced rear end portion of the connector and held thereon by means of a nut 84 threadably engaging a second and further reduced rear portion of the connector, the ring being fixed to the tubular shaft by depositing weld metal in a series of circumferentially spaced tube apertures 86 exposing outer peripheral portions of the ring. This manner of mounting the drawbar connector affords a compact, rigid construction which permits the connector to swivel about an axis extending longitudinally of the pole. And it should now be apparent that the draft means comprises a single pole element coupled with and carried by a single head block for pivotal movement about a horizontal axis generally parallel to the forward side member of the front gang frame and for adjustably changing, through means of the pin connection with the pairs of vertical holes at the forward end of the pole plate structure, the angle between the pole and said horizontal axis, the effective hitch point of the pole to the head block or frame being vertically adjustable as hereinbefore pointed out in connection with the vertically spaced pairs of aligned holes 61.

In connection with the operation and adjustment of the harrow structure thus far described, it should be noted, particular reference being had to Fig. 2, that when the disc gang frames are in closed or transport position, the piston is at the free end of the cylinder and the piston rod projects a maximum distance therefrom. This relation of the piston and cylinder to the hinge connection is highly desirable in that during discing operations a minimum portion of the rod is exposed to the dust created by the action of the discs. In addition, it should be noted that both the piston and rod are positioned generally between the vertically spaced arms of the front and rear bracket structures and are thereby effectively shielded by these bracket structures at all times. Thus it is readily apparent that the above discussed coaction of parts of the hydraulic unit and the center hinge greatly increases the durability and life of the hydraulic unit.

In order to shift the gangs from the position shown in Fig. 2 to that shown in Fig. 1, all that is necessary is for the operator to move the usual control valve (not shown) to simultaneously admit and withdraw pressure fluid from the opposite ends of the cylinder. And as a result the piston and rod move into the cylinder pulling the gangs into the position shown in Fig. 1. And if desired, the extent to which the gangs can be spread apart or angled may be either controlled by the operator's actuation of the above mentioned control valve or by suitably adjusting the stop means on the chatter bar. If the stop means on the chatter bar is utilized for limiting gang angling, the operator need not bother with the control valve until it is again desired to shift the front and rear gangs relative to each other.

Another feature of the hinge construction which is of particular importance is the provision of a rear bracket structure which when loosened on the rear gang can be shifted therealong, as desired, by an application of force longitudinal of the draft pole. It being understood that each time a harrow is offset, or the existing offsetting changed, the operating relation of the front and rear discs changes so that the rear discs are no longer following in the spaces between the front discs as they are intended to do. Therefore, in order to realign the rear discs with the spacings between the front discs the rear gang must be laterally shifted. To effect this lateral adjustment of the rear gang all that has to be done is to loosen U bolts 22 (the bracket remaining on rear frame side member 7, and then either move the front gang frame toward or away from the rear gang frame a sufficient extent to effect a sliding movement of bracket 21 the desired distance longitudinally of rear frame side member 7. To render the hydraulic gang mechanism effective again all that need be done is to tighten U bolts 22 thereby fixing bracket 21 in the desired position.

Still another feature of importance afforded by the harrow construction thus far described, and more particularly the draft means, is the ease with which the harrow may be offset or the existing offsetting changed. In order to offset any disc harrow, it is necessary to change the angles of both the front and rear gangs with respect to the direction of travel and with the construction disclosed this can be readily accomplished simply by disconnecting the single head block and shifting the same longitudinally of side member 7 of the front gang as desired. It being understood that moving the head block to the right as viewed in Fig. 1 produces right hand offsetting with respect to the tractor or other vehicle coupled to the forward end of the draft pole, while movement of the head block to the left as viewed in the drawing produces left hand offsetting with respect to the tractor. With the construction shown, offsetting of the harrow in either direction is accomplished without changing the total working angle since offsetting to the right decreases the angle of the front gang and correspondingly increases the angle of the rear gang whereas offsetting to the left increases the angle of the front gang and decreases the angle of the rear gang. Consequently, a more equal division of the working angle between the front and rear gangs is maintained irrespective of variations in the total working angle afforded by actuation of the hydraulically actuated angling mechanism, since a correct line of draft through the pole can be readily obtained simply by angularly shifting the single draft pole relative to the pole plate supporting structure. In addition, the draft structure affords a wide range of offsetting positions, a close coupling hitch point to the tractor drawbar which remains substantially constant irrespective of the degree of offsetting adjustment and irrespective of variations in the angle between the longitudinal axis of the single draft pole and the horizontal axis about which such pole pivots vertically relative to the front frame. An additional feature afforded by the draft construction is that the penetration of the front disc gang can be readily controlled and varied simply by effecting a vertical adjustment of the pole plate structure relative to the head block as previously described.

Referring particularly to Figs. 9 and 10, it will be seen that if desired a simple bar and latch structure may be readily substituted for the hydraulic actuated gang-angling mechanism previously described. This is accomplished by employing a rigid bar 177 having at one end thereof a vertically disposed pivot pin receiving portion 178 and having in its opposite end a series of longitudinally spaced apertures 179. The pin receiving or bearing end of this bar is attached to the free end portion of arms 23 on the rear bracket structure in generally the same manner as piston rod 34, that is, by means of pin 36, and the apertured end thereof is slidably disposed in a channel shaped swivel bracket 75 pivotally secured in the hole or aperture provided in lower arm 27 of the front bracket structure adjacent the frame end thereof. The corresponding hole in the upper arm of the front bracket structure has mounted therein a spring biased rod 85 having a reduced lower end portion 87 engageable with any selected one of the series of apertures 179 in bar 177. This rod is provided with a spring seat 88 positioned above the reduced lower end portion thereof and retained thereon by a suitable cotter pin 89, and a compression spring 90 is disposed between this seat and the lower end of a depending collar part 95 fixed to and surrounding the hole in the upper arm. Rod 85 projects upwardly through the aforementioned collar and hole and is provided thereabove with a transversely extending pin 99 having projecting end portions disposed in cam recesses 91 formed in a collar 92 surrounding the rod. Collar 92 is held against rotation relative to rod 85 by means of an aperture in the under side of the collar receiving a fixed pin 93 projecting upwardly from the top side of the upper arm 27. The upper end of rod 85 has fixedly attached thereto a laterally projecting arm 94 including a hub portion 96 depending therefrom in surrounding relation with respect to collar 92. In assembling this latch mechanism, collar 92 is positioned on the top side of upper arm 27 with the projecting pin thereon extending into the recess in the bottom edge of the collar and rod 85 is then inserted through this collar and through collar 95 depending beneath upper arm 27. Spring 90 is then positioned around the rod and compressed thereon sufficiently to permit assembly of spring seat 88 and cotter pin 89 thereon. When thus assembled handle 94 can be turned to raise the lower end of the rod 85 relative to bar 177 thereby permitting this bar to be slidably moved in bracket 75. The underside of bar 177 is preferably provided with a pair of longitudinally spaced, depending stops 97 which limit the sliding movement of the bar relative to the pivot mounting and thereby prevent movement of the bar into an inoperative position.

This modified construction permits angling the gangs relative to each other simply by pulling on arm 94 through means of a rope or the like 98, which preferably extends to a point within easy reach of the operator's station (not shown), so as to disengage the reduced end portion of rod 85 from engagement with bar 177 whereupon the desired angling can be readily effected simply by moving the harrow forward or rearward. When the desired degree of angling or straightening is attained, the arm is released whereupon spring 90 forces rod 85 into engagement with the underlying aperture in bar 177. Aside from the "power operated" feature of the hydraulic device this bar and latch structure affords all of the advantages previously mentioned insofar as lateral adjustment of the rear gang is concerned. However, it must be borne in mind that a construction of this kind may in some instances be less desirable than a hydraulic power means since it necessitates stopping the harrow and reversing movement thereof in order to effect variations in gang angling.

It should now be apparent that the construction of various elements and parts and the combination and subcombinations of such elements and parts afford numerous advantages with respect to operation, flexibility of adjustment and simplification as hereinabove more fully described and it should be understood that it is not intended to limit this invention to the constructions, combinations and subcombinations herein shown and described for purposes of illustration as various modifications thereof coming within the scope of the appended claims may occur to persons skilled in the art.

It is claimed and desired to secure by Letters Patent:

1. In a tandem disc harrow, a front disc-gang mounting frame and a rear disc-gang mounting frame having opposed end portions thereof connected together for relative horizontal angular movement about a single vertical pivot axis disposed between said opposed end portions, a hydraulic unit comprising a cylinder carried by one of said frames to extend therealong generally in the direction of the axis of rotation of the disc gang mounted on said one frame and a piston movable within said cylinder from one end thereof to the other end by admission of pressure fluid into said cylinder at said one end thereof, a piston rod connected with the other of said frames and with said piston so that said frames swing from an inoperative transport position to an operative angled position upon admission of pressure fluid to said one end of the cylinder, a rigid bar having one end portion pivotally connected with one of said frames at a point in transversely spaced relation to said pivot axis and having its other end portion connected with a similar point on the other of said frames for both sliding and pivotal movement relative thereto, and adjustable stop means coacting with said rod to selectively limit a sliding movement thereof relative to said other frame upon admission of pressure fluid to said one end of said cylinder.

2. In a tandem disc harrow, a front frame and a rear frame each comprising a pair of elongated, rigidly interconnected front and rear side members, front and rear disc gangs rotatably mounted, respectively, on said front and rear frames, a single head block mounted on said front side member of said front frame for adjustment therealong in a direction generally parallel to the axis of rotation of said front disc gang, a single draft pole projecting forwardly from said head block and presenting a free end portion provided with a drawbar connector swiveled for turning movement about an axis extending longitudinally of said pole, said pole having its rear end coupled with and carried by said head block for pivotal movement relative thereto about a horizontal axis generally parallel to said front side member of said front frame and for adjustably changing the angle between said pole and said horizontal axis, a bracket disposed forwardly of and engaged in rearwardly abutting relation with the front side member of said rear frame, vertically spaced bolt elements extending rearwardly from said bracket in straddling relation to said front side member of said rear frame so as to support said bracket on said rear frame for adjustment therealong in a direction generally parallel to the axis of rotation of said rear disc gang, clamping means including nuts threadedly engaged with said bolts for locking said bracket selectively in different positions of adjustment along said rear frame, a rigid arm projecting forwardly from said bracket and presenting a free end portion remote therefrom, means connecting said front frame to said arm at a point intermediate said free end portion thereof and said bracket, said means affording a vertical pivot axis about which said frames may swing relative to each other, and additional means including a thrust-transmitting element connecting said front frame with the free end portion of said arm for controlling the swinging of said frames relative to each other, said bracket, upon loosening of said clamping means coacting with said rear frame and with said additional means, front frame and draft pole so as to be shifted along said rear frame in response to an application of force longitudinally of said pole.

3. In a tandem disc harrow, a front frame and a rear frame each comprising a pair of elongated, rigidly interconnected front and rear side members, front and rear disc gangs rotatably mounted, respectively, on said front and rear frames, a single head block mounted on said front side member of said front frame for adjustment therealong in a direction generally parallel to the axis of rotation of said front disc gang, a single draft pole projecting forwardly from said head block and presenting a free end portion provided with a drawbar connector swiveled for turning movement about an axis extending longitudinally of said pole, said pole having its rear end coupled with and carried by said head block for pivotal movement relative thereto about a horizontal axis generally parallel to said front side member of said front frame and for adjustably changing the angle between said pole and said horizontal axis, a bracket disposed forwardly of and engaged in rearwardly abutting relation with the front side member of said rear frame, vertically spaced bolt elements extending rearwardly from said bracket in straddling relation to said front side member of said rear frame so as to support said bracket on said rear frame for adjustment therealong in a direction generally parallel to the axis of rotation of said rear disc gang, clamping means including nuts threadedly engaged with said bolts for locking said bracket selectively in different positions of adjustment along said rear frame, means connecting said front frame with a portion of said bracket and affording a vertical pivot axis about which said frames may swing relative to each other, and additional means including a thrust-transmitting element connecting said front frame with another portion of said bracket for controlling the swinging of said frames relative to each other, said bracket, upon loosening of said clamping means, coacting with said rear frame and with said additional means, front frame and draft pole so as to be shifted along said rear frame in response to an application of force longitudinally of said pole.

4. In a tandem disc harrow, a front frame and a rear frame each comprising a pair of elongated, rigidly interconnected front and rear side members, front and rear disc gangs rotatably mounted, respectively, on said front and rear frames, a single draft pole projecting forwardly from said front frame and presenting a free end portion provided with a drawbar connector swiveled for turning movement about an axis extending longitudinally of said pole, said pole having its rear end coupled with and carried by said front frame for pivotal movement relative thereto about a horizontal axis generally parallel to the forward side of said front frame and for adjustably changing the angle between said pole and said horizontal axis, a bracket disposed forwardly of and engaged in rearwardly abutting relation with the front side member of said rear frame, vertically spaced bolt elements extending rearwardly from said bracket in straddling relation to said front side member of said rear frame so as to support said bracket on said rear frame for adjustment therealong in a direction generally parallel to the axis of rotation of said rear disc gang, clamping means including nuts threadedly engaged with said bolts for locking said bracket selectively in different positions of adjustment along said rear frame, means connecting said front frame with a portion of said bracket and affording a vertical pivot axis about which said frames may swing relative to each other, and additional means including a thrust-transmitting element connecting said front frame with another portion of said bracket for controlling the swinging of said frames relative to each other, said bracket, upon loosening of said clamping means, coacting therewith and with said additional means, front frame and draft pole so as to be shifted along said rear frame in response to an application of force longitudinally of said pole.

5. In a tandem disc harrow, a front frame and a rear frame each comprising a pair of elongated, rigidly interconnected front and rear side members, front and rear disc gangs rotatably mounted, respectively, on said front and rear frames, a single draft pole projecting forwardly from said front frame and having its rear end coupled with and carried by said front frame for pivotal movement relative thereto about a horizontal axis generally parallel to the forward side of said front frame and for adjustably changing the angle between said pole and said horizontal axis, a bracket disposed forwardly of and engaged in rearwardly abutting relation with the front side member of said rear frame, vertically spaced bolt elements extending rearwardly from said bracket in straddling relation to said front side member of said rear frame so as to support said bracket on said rear frame for adjustment longitudinally therealong, clamping means including nuts threadedly engaged with said bolts for locking said bracket selectively in different positions of adjustment along said rear frame, means connecting said front frame with a portion of said bracket and affording a vertical pivot axis about which said frames may swing relative to each other, and additional means including a thrust-transmitting element connecting said front frame with another portion of said bracket for controlling the swinging of said frames relative to each other, said bracket, upon loosening of said clamping means, coacting with said rear frame and with said additional means, front frame and draft pole so as to be shifted along said rear frame in response to an application of force longitudinally of said pole.

6. In a tandem disc harrow, a front disc-gang mounting frame and a rear disc-gang mounting frame having opposed end portions thereof operatively connected together for relative horizontal angular movement about a vertical pivot axis, a single head block mounted on the forward side of said front frame for adjustment therealong in a direction generally parallel to the axis of rotation of the front disc gang, a draft pole supporting structure pivotally connected with said head block on a horizontal pivot axis generally parallel to said axis of rotation of said forward disc gang and adjustable in unison with said head block relative to said front frame, and a single draft pole projecting forwardly from said supporting structure and presenting a free end portion provided with a drawbar connector swiveled for turning movement about an axis extending longitudinally of said pole, said pole having its rear end coupled with and carried by said supporting structure for pivotal movement therewith on said horizontal axis and for adjustably changing the angle between said pole and said horizontal pivot axis.

7. In a tandem disc harrow, a front disc gang mounting frame and a rear disc gang mounting frame having opposed end portions thereof operatively connected together by means affording relative horizontal angular movement between said frames about a vertical pivot axis, said means including a detachable connection with one of said gang mounting frames affording adjustment longitudinally therealong, a head block mounted on the forward side of said front frame for adjustment therealong, a draft pole supporting structure, a draft pole projecting forwardly from said supporting structure and presenting a free end portion provided with a drawbar connector, pivot means operatively interposed between said head block and said draft pole supporting structure for swingably securing said supporting structure on a horizontal axis generally parallel to the forward side of said front frame, and adjustable connecting means between said draft pole and said supporting structure permitting adjustment of said draft pole angularly relative to said horizontal axis and locking of said draft pole on said supporting structure in different angularly adjusted positions.

8. A tandem disc harrow comprising, in combination, a front disc gang mounting frame, a rear disc gang mounting frame, a pair of hingedly interconnected bracket members rigidly secured, respectively, to said front and rear frames and presenting a vertical pivot axis in a plane extending transversely of one of said frames intermediate the axially opposite ends of the latter, and a pair of adjustably interconnected thrust transmitting elements operatively interposed between said one frame and the bracket member secured to the other of said frames for selectively locking said frames in an angled working position or in a deangled nonworking position, one of said thrust transmitting elements being operatively connected with said one frame at a first point in transversely spaced relation to said plane, and the other of said thrust transmitting elements being connected with the bracket member of said other frame at a second point which in said angled working position of said frames is spaced from said first point on a line substantially at right angles to said plane.

9. A tandem disc harrow as set forth in claim 8, in which said interconnected thrust transmitting elements comprise a swivel bracket pivotally mounted on said one frame, a bar slidably connected with said swivel bracket and pivotally secured to said bracket member of said other frame, and a locking element cooperable with said swivel bracket and bar to releasably secure said bar against sliding movement relative to said swivel bracket.

10. A tandem disc harrow comprising, in combination, a front frame and a gang of discs mounted thereon for rotation on an axis extending longitudinally of said front frame, a rear frame and a gang of discs mounted thereon for rotation of an axis extending longitudinally of said rear frame, a bracket member rigidly secured to one of said frames in transversely extending relation thereto, another bracket member slidably mounted in vertically supported and longitudinally guided relation on the other of said frames, releasable fastening means operable to lock said other bracket member selectively in different positions of longitudinal adjustment on said other frame, pivot means hingedly connecting said bracket members together on a vertical axis in a plane extending transversely of said one frame intermediate the axially opposite ends of the latter, and a pair of adjustably interconnected thrust transmitting elements operatively interposed between said one frame and said slidably mounted bracket member and effective, upon locking of the latter in any of its adjusted positions and upon relative adjustment of said frames to an angled working position, to secure said frames against relative angular displacement about said vertical axis, one of said thrust transmitting elements being operatively connected with said one frame at a first point in transversely spaced relation to said plane, and the other of said thrust transmitting elements being operatively connected with said slidably mounted bracket member at a second point which in said angled working position of said frames is spaced from said first point on a line substantially at right angles to said plane.

11. In a tandem disc harrow, a front disc gang mounting frame, a rear disc gang mounting frame, a pair of hingedly interconnected bracket members rigidly secured, respectively, to said front and rear frames and presenting a vertical pivot axis in a plane extending transversely of one of said frames intermediate the axially opposite ends of the latter, the bracket member secured to said one frame comprising a pair of vertically spaced arms in straddling relation to the other of said bracket members, and a pair of adjustably interconnected thrust transmitting elements operatively interposed between said one frame and said other bracket member for selectively locking said frames in an angled working position or in a deangled nonworking position, one of said thrust transmitting elements being operatively connected with said one frame at a first point in transversely spaced relation to said plane, and the other of said thrust transmitting elements being connected with said other bracket member at a second point which in said angled working position of said frames is spaced from said first point on a line substantially at right angles to said plane.

12. A tandem disc harrow comprising, in combination, a front disc gang mounting frame, vertically spaced bracket arms rigidly connected with and extending rearwardly from said front frame, a rear disc gang mounting frame, a bracket member rigidly connected with said rear frame and extending forwardly therefrom into the space between said vertically spaced bracket arms of said front frame, pivot means connecting said forwardly extending bracket member at a portion thereof adjacent to said rear frame with rearward portions of said rearwardly extending bracket arms and presenting a vertical pivot axis in a plane extending transversely of said front frame intermediate the axially opposite ends of the latter, and a pair of adjustably interconnected thrust transmitting elements operatively interposed between said front frame and said forwardly extending bracket member for selectively locking said frames in an angled working position or in a deangled nonworking position, one of said thrust transmitting elements being pivotally mounted between said vertically spaced bracket arms on a first center spaced transversely from said plane, and the other of said thrust transmitting elements being pivotally secured to said forwardly extending bracket member on a second center which in said angled working position of said frames is spaced from said first center on a line substantially at right angles to said plane.

13. A tandem disc harrow comprising, in combination, a front disc gang mounting frame, a rear disc gang mounting frame, a pair of hingedly interconnected bracket members rigidly secured, respectively, to said front and rear frames and presenting a vertical pivot axis in a plane extending transversely of one of said frames intermediate the axially opposite ends of the latter, an axially contractable and expandable hydraulic ram comprising relatively reciprocable cylinder and piston elements, pivot means connecting one of said ram elements with said one frame on a first center laterally of said plane, and pivot means connecting the other of said ram elements with the bracket member of said other frame on a second center spaced from said vertical pivot axis so that said frames will be moved from an angled working position to a deangled nonworking position by axial expansion of said ram and so that said frames will be moved from a deangled nonworking to an angled working position by axial contraction of said ram.

14. In a tandem disc harrow, a front disc gang mounting frame and a rear disc gang mounting frame having opposed end portions thereof operatively connected together by means affording relative horizontal angular movement between said frames about a vertical pivot axis, a head block selectively connectable with said front frame in different positions of adjustment endwise of said front frame and having a pair of vertically extended forward projections in horizontally spaced relation to each other, a draft pole supporting structure extending into the space between said head block projections, pivot means connected in vertically adjustable relation with said head block projections and cooperable with said supporting structure to swingably mount the latter selectively on vertically spaced axes extending generally parallel to the axis of rotation of the front disc gang, a draft pole adapted for connection at its forward end with a draft vehicle, and adjustable connecting means operatively interposed between said draft pole supporting structure and a rearward portion of said draft pole, so as to permit adjustment of said draft pole angularly relative to the axis of pivotal connection of said supporting structure with said head block, and locking of said draft pole on said supporting structure in different angularly adjusted positions.

15. In a tandem disc harrow, a front frame and a rear frame each comprising a pair of elongated, rigidly interconnected front and rear side members, front and rear disc gangs rotatably mounted, respectively, on said front and rear frames, a single head block mounted on said front side member of said front frame for adjustment therealong in a direction generally parallel to the axis of rotation of said front disc gang, a draft pole adapted for connection at its forward end with a draft vehicle and having its rear end coupled with and carried by said head block for swinging movement relative thereto about a horizontal pivot axis generally parallel to said axis of said front disc gang and for adjustably changing the angle between said pole and said horizontal pivot axis, a bracket member rigidly secured to said front frame in rearwardly projecting relation to said rear side member thereof, another bracket member slidably mounted in vertically supported and longitudinally guided relation on the front side member of said rear frame, releasable fastening means operable to lock said other bracket member selectively in different positions of longitudinal adjustment on said front side member of said rear frame, pivot means hingedly connecting said bracket members together on a vertical axis in a plane extending transversely of said front frame intermediate the axially opposite ends of the latter, and a pair of adjustably interconnected thrust transmitting elements operatively interposed between said front frame and said slidably mounted bracket member and effective, upon locking of the latter in any of its adjusted positions, to secure said frames against relative angular displacement about said vertical axis.

References Cited in the file of this patent

UNITED STATES PATENTS

| Number | Name | Date |
|---|---|---|
| 1,769,123 | Dwyer | July 1, 1930 |
| 1,790,061 | Lindgren | Jan. 27, 1931 |
| 1,824,011 | Enzenauer et al. | Sept. 22, 1931 |
| 1,836,227 | Curry et al. | Dec. 15, 1931 |
| 2,167,768 | Mitchell | Aug. 1, 1939 |
| 2,285,550 | Woods | June 9, 1942 |
| 2,303,320 | Benjamin et al. | Dec. 1, 1942 |
| 2,334,455 | Thomas | Nov. 16, 1943 |
| 2,337,801 | Cook | Dec. 28, 1943 |
| 2,356,876 | Newkirk | Aug. 29, 1944 |
| 2,608,814 | Frank | Sept. 2, 1952 |